United States Patent [19]

Moore

[11] Patent Number: 5,510,170
[45] Date of Patent: Apr. 23, 1996

[54] SECURING PACKING ELEMENTS

[75] Inventor: Frank D. Moore, Tallmadge, Ohio

[73] Assignee: Norton Chemical Process Products Corp., Worcester, Mass.

[21] Appl. No.: 218,278

[22] Filed: Mar. 25, 1994

[51] Int. Cl.⁶ .............................. B32B 3/28; B01D 47/00; B01F 3/04
[52] U.S. Cl. .................. 428/184; 428/185; 261/112.2; 261/DIG. 72
[58] Field of Search ................................... 428/182, 184, 428/185, 183, 212, 192, 105, 120; 261/112.2, DIG. 72; 52/795, 798, 800; 210/150, 151

[56] References Cited

U.S. PATENT DOCUMENTS

| | | | |
|---|---|---|---|
| 4,296,050 | 10/1981 | Meier | 261/112 |
| 4,472,473 | 9/1984 | Davies et al. | 428/182 |
| 4,668,443 | 5/1987 | Rye | 261/112 |
| 4,740,334 | 4/1988 | Rukovena | 261/112 |
| 4,800,047 | 1/1989 | Monjoie | 261/112.2 |
| 4,950,430 | 8/1990 | Chen et al. | 261/112.2 |
| 4,981,621 | 1/1991 | Pluss | 261/112.2 |
| 5,217,778 | 6/1993 | Rye | 428/182 |

*Primary Examiner*—Donald J. Loney
*Attorney, Agent, or Firm*—David Bennett

[57] ABSTRACT

Corrugated tower packings which are easier to fabricate from individual corrugated elements having parallel rows of ridges and valleys wherein the elements are provided with extension tabs along the ridges of at least a first surface of such elements to provide a location at which the tabs can be spot welded to a contacting element to provide a rigid structure.

9 Claims, 1 Drawing Sheet

SECURING PACKING ELEMENTS

BACKGROUND OF THE INVENTION

This invention relates to mass transfer packing elements, (sometimes called structured packing elements), and specifically to packing elements in the form of corrugated sheets of the kind provided in stacks with the lines of corrugation angled with respect to the sheets directly above and below.

Packing elements of the above kind are frequently used in mass transfer and heat transfer applications where the process requires that a liquid be placed in intimate contact with a counterflowing gas with a view to either extracting or entraining a component, reducing or increasing the temperature or facilitating a chemical reaction. In such cases the corrugated sheets generally define a plurality of pathways through which the liquid may pass as in transits the container in which the sheets are stacked, which is often a mass transfer tower. The liquid is constrained to flow in as thin a film as possible to maximize the surface area in contact with the gas.

The stacked corrugated sheets are typically located vertically with the lines of corrugations making an acute angle to the vertical with the angle being essentially constant in size but alternating to the left and right of the vertical in successive contacting sheets.

Providing a stack of sheets in such a fashion that the individual sheets will not become deformed or displaced in transit or in use has required that the sheets be fastened together in some fashion. This fastening also aids in the assembly and disassembly of the packing in the tower. Fastening has been done for example by driving one or more threaded screws through the stack of assembled elements. Alternatively one or more plain rods can be used with the exposed ends flattened to form a rivetted attachment. A further alternative comprises welding the sheets to one another at the points at which the corrugations contact one another.

Each of the above alternatives has its drawbacks. Screwing or rivetting can deform or skew the elements rendering them less efficient. In addition if, as is often the case, the elements have structural features such as indentations, perforations or reversals of the crests and valleys of the corrugations, these features may become distorted and ineffective. Welding the successive sheets can be difficult if the amplitude of the corrugations is small and the contacting area is likewise small. The chances of a misplaced spot weld is high and even well placed welds may be of such a small area that they are relatively weak.

The present invention provides a method of attaching a plurality of corrugated sheets that is very secure and easily carried out with minimal danger of any deformation of the sheets resulting therefrom. The process is adapted to be used with any design of corrugated sheet regardless of any structure imposed on the basic corrugated shape. It is therefore readily adapted to use wherever such tower packings are used.

DESCRIPTION OF THE INVENTION

Corrugated mass transfer elements according to the invention are provided with alternating lines of ridges and valleys defining the corrugations and are provided with tab extensions along at least part of at least some of the ridges on at least one and preferably both faces of the element, said tab extensions extending tangentially to the ridge at the crest thereof.

The tab extensions should be large enough to ensure that when the elements are stacked for mass transfer use, the area of the tab extensions in contact with the adjacent elements will provide an adequate base for spot welding the sheets together. The width of the tabs is preferably less than the distance separating adjacent crests on the same element, such as for example from about 30 to about 80% of the crest separation. The length along the ridge line occupied by the tab may be the full length of the ridge across the element but it may often be desirable to space the tabs such they occupy from about 10 to about 75% and preferably 40 to 60% of the linear length of each ridge.

The tabs can extend on both sides of the crest of a ridge by equal of different amounts. By preference however they extend only in only one tangential direction at right angles to the line of the ridge.

The tabs have been described as having length and width but it is to be understood that they are not necessarily rectangular but can equally have any other configuration such as round or oval providing they present a matching surface to the tab of the adjacent element and adapted to be welded thereto. In some circumstances in which the tabs are very precisely located, they may even have mini-corrugations adapted to engage similar mini-corrugations on an opposing tab and further aid in locating the elements with respect to one another.

The tabs may be formed by welding an appropriate piece of metal to the crest line but preferably they are formed by cutting a suitable flap from the corrugated sheet, either before or after the corrugations are formed, and deforming the flap such that it extends tangentially from the crest line of the ridge.

As has been indicated above the tabs may be formed only on the crest lines of the ridges on one side of the corrugated sheet. In this case, instead of being spot-welded to a corresponding tab on a contiguous sheet, the tab is spot welded to the underside of a valley in the contiguous sheet. In general this is a less preferred embodiment since the location of the tabs with respect to the contiguous sheet becomes more critical.

Figure 1:
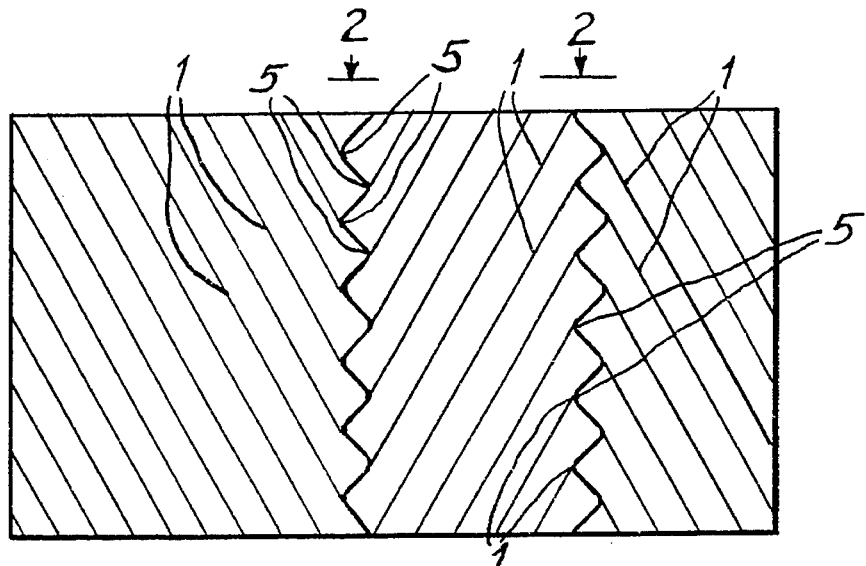
FIG. 1 is a partial cutaway elevation showing three corrugated elements with the lines of corrugations comprising ridges 1 and valleys 5 extending at alternating angles to the vertical. The tabs are not shown in this Figure for the sake of clarity.
Figure 2:
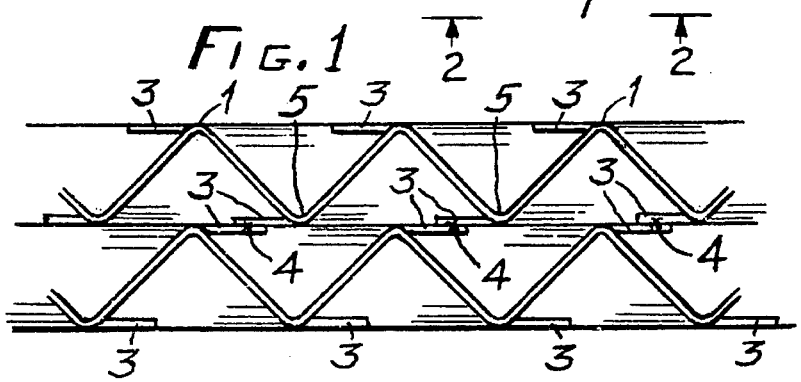
FIG. 2 is a view along the line 2–2' of FIG. 1 showing the tabs 3 and the spot welds 4 by which the tabs are secured to one another. In this embodiment there are tabs on both the crests or the ridges and on the undersides of the valleys such that contacting tabs can be spot-welded together.
Figure 3:
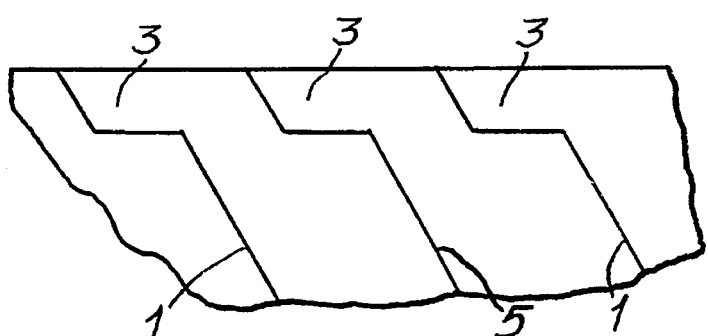
FIG. 3 is a plan view of an element according to the invention showing the spacing of tabs 3 along the crests of the ridges 1 of the corrugations.
Figure 4:
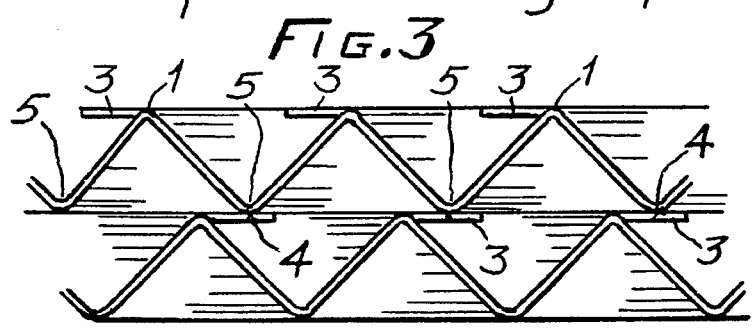
FIG. 4 is a view corresponding to that in FIG. 2 and illustrating an alternative embodiment in which the tabs 3 appear only on the ridges 1 of the corrugations. In this embodiment the tabs have spot welds 5 joining the tabs to the undersides of the valleys of the contiguous sheet above at the point of contact rather than to tabs extending from the said valley undersides.

The elements are placed together such that the tabs on contacting sheets provide a suitably large area for satisfactory spot welds at intervals along the lines of at least some of the ridges.

The drawings illustrate only one form of tab and placement of tabs on the elements of the invention. It is to be understood that the invention is not circumscribed by these embodiments but extends equally to all similar designs having an equivalent effect.

What is claimed is:

1. A tower packing assembly comprising a plurality of corrugated packing elements each having alternating ridges and valleys and provided, along at least a portion of at least some of the crests of the ridges, with tab extensions tangential to the crest and at right angles thereto, the elements being in face to face relationship with the lines of corrugations angled with respect to those on contiguous elements and the elements being held together at locations in which the tab extensions are in contact with a contiguous sheet.

2. An assembly according to claim 1 in which at least some of the ridges on both sides of the elements are provided with tab extensions extending tangentially from the crest of the ridge in the direction of one of the adjacent ridges.

3. An assembly according to claim 1 in which the tab extensions extend the full length of a ridge.

4. An assembly according to claim 1 in which the tab extensions extend away from the crest of a ridge by an amount equal to from about 20 to about 80% of the separation of the crests of adjacent ridges.

5. An assembly according to claim 1 in which the tab extensions extend tangentially from the crest towards only one adjacent crest.

6. A tower packing assembly comprising a plurality of corrugated packing elements each having alternating ridges and valleys with at least some of the ridges of the element being provided with tab extensions extending tangentially from the crest of the ridge in the direction of one of the adjacent ridges by an amount that is from about 40 to about 60% of the distance separating adjacent crests, the elements being in face to face relationship with the lines of corrugations angled with respect to those on contiguous elements and the elements being held together at locations in which the tab extensions are in contact with a contiguous sheet.

7. A tower packing assembly comprising a plurality of corrugated packing elements each having alternating ridges and valleys with at least some of the ridges on both sides of the element being provided with tab extensions extending tangentially from the crest of the ridge in the direction of one of the adjacent ridges by an amount that is from about 40 to about 60% of the distance separating adjacent crests, the elements being in face to face relationship with the lines of corrugations angled with respect to those on contiguous elements and the elements being held together at locations in which the tab extensions on contiguous sheets are in contact.

8. A tower packing assembly comprising a plurality of corrugated packing elements according to claim 1 with the lines of ridges and valleys displaced alternately to the left and to the right of the vertical by equal amounts such that tab extensions on the ridges of a first element contact the undersides of valleys on a second element directly above the first element and are spot welded to one another at such contact points to provide a rigid integrated structure.

9. A tower packing assembly comprising a plurality of contiguous corrugated packing elements according to claim 7 with the lines of ridges and valleys displaced alternately to the left and to the right of the vertical by equal amounts such that the tab extensions on adjacent contiguous elements contact one another and are welded to one another to provide a rigid integrated structure.

* * * * *